United States Patent

Freter et al.

[11] 3,723,440
[45] Mar. 27, 1973

[54] DERIVATIVES OF 6,7-BENZOMORPHAN

[75] Inventors: Kurt Freter; Karl Zeile, both of Ingelheim am Rhine, Germany

[73] Assignee: C. H. Boehringer Sohn, Ingelheim am Rhine, Germany

[22] Filed: Oct. 12, 1960

[21] Appl. No.: 62,099

[30] Foreign Application Priority Data

Oct. 16, 1959  Germany..............................B 55 207

[52] U.S. Cl..............................260/293.54, 424/267
[51] Int. Cl. ................................................C07d 39/00
[58] Field of Search .................265/285; 260/293.54

[56] References Cited

UNITED STATES PATENTS 2,924,603   2/1960   Gordon et al. ........................260/285
3,138,603   6/1964   May ................................260/294.3

OTHER PUBLICATIONS

May et al., J. Org. Chem. 22, 1366–1369 (1957).
May et al., J. Org. Chem. 24, 1432–1437 (1959).
May et al., J. Org. Chem. 25, 984–986 (1960).
Grussner et al., Helv. Chim. Acta 39, 436–440 (1956).
Ager et al., J. Org. Chem. 25, 984–986 (1960).
Archer et al., J. Med. Chem. 7, 123–127 (1964).

*Primary Examiner*—Henry R. Jiles
*Assistant Examiner*—G. Thomas Todd
*Attorney*—Hammond & Littell

[57] ABSTRACT

A benzomorphan selected from the compounds of the formula

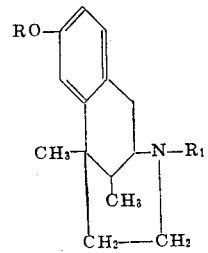

wherein R is hydrogen or acyl and R is a saturated or saturated acyclic hydrocarbon radical with three carbon atoms and their non-toxic, pharmacologically acceptable acid addition and quaternary salts exhibit strong analgesic activities without the undesirable side effects of morphine.

7 Claims, No Drawings

DERIVATIVES OF 6,7-BENZOMORPHAN

This invention relates to novel derivatives of 6,7-benzomorphan, and more particularly to compounds having the structural formula

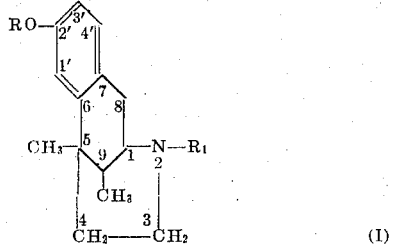

wherein R is hydrogen or acyl, especially lower alkanoyl, and $R_1$ is a saturated or unsaturated acyclic hydrocarbon radical with 3 carbon atoms, and their non-toxic, pharmacologically acceptable acid addition and quaternary salts.

In an article by E. May and N. Eddy, J. Organ. Chem., 24, 294 (1959) it is reported that the 6,7-benzomorphan derivative 2'-hydroxy-5,9-dimethyl-2-(N-β-phenethyl)-6,7-benzomorphan (also known as phenazocine) of the formula

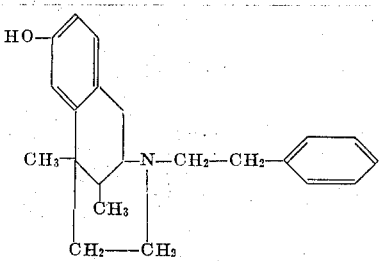

exhibits analgesic properties the intensity of which exceeds those of morphine manifold. However, pharmacological and clinical tests of this compound have shown that this high analgesic activity is also accompanied by the undesirable side effect which morphine produces, namely drowsiness, respiratory depression, miosis, hypothermia and the like. Moreover, the compound described by May and Eddy produces addiction after extended regular use.

It has long been the endeavor of pharmacologists and chemists to provide new analgesics which exhibit an analgesic activity about equal to or higher than that of morphine without the undesirable side effects of the opium alkaloids, particularly with respect to addiction.

In pursuit of this endeavor we have made the surprising discovery that compounds having the structural formula I above and their non-toxic, pharmacologically acceptable acid addition and quaternary salts exhibit strong analgesic activities without the undesirable side effects of morphine. Moreover, the compounds according to the present invention are effective morphine antagonists, which assures the availability of analgesics free from habit-forming properties.

The novel derivatives of 6,7-benzomorphan embraced by formula I above may be prepared by reacting 2'-hydroxy-5,9-dimethyl-6,7-benzomorphan with an equimolar amount of an alkylating agent, such as a compound of the formula $$R_1 - Hal \qquad (II)$$

wherein $R_1$ has the meaning previously defined and Hal is a halogen, especially chlorine, bromine or iodine, under customary alkylating conditions to produce a compound of the formula

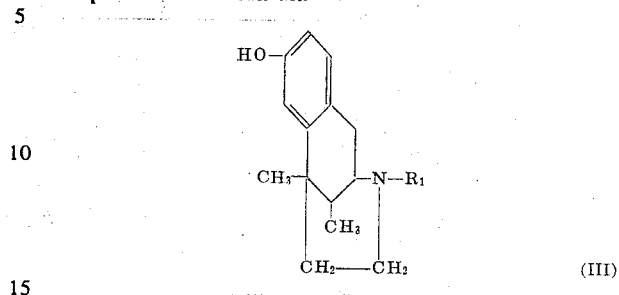

wherein $R_1$ has the meanings previously defined. The above reaction is advantageously carried out in an inert organic solvent wherein the reactants are soluble, such as alcohols or tetrahydrofuran, preferably under exclusion of water and at elevated temperatures, such as at the boiling point of the reaction mixture. The process produces especially good yields when an acid-neutralizing agent capable of tying up the hydrogen halide formed by the reaction is added to the reaction mixture in an amount in excess of the molar amount needed to neutralize the calculated quantity of hydrogen halide. Alkali metal bi-carbonates are particularly suited for this purpose.

If it is desired to obtain compounds of the formula I wherein R is acyl, especially lower alkanoyl, the 2'-hydroxy compound of the formula III is reacted with an acylating agent, such as a lower alkanoic acid anhydride, to produce a compound of the formula

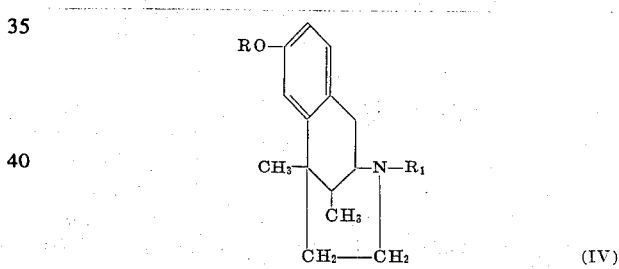

wherein R is acyl, especially lower alkanoyl, and $R_1$ has the meanings previously defined.

If it is desired to prepare non-toxic, pharmacologically acceptable acid addition salts of the free bases, compounds III or IV are reacted with an inorganic or organic acid comprising a non-toxic anion. Typical examples of such acids are hydrochloric acid, hydrogen bromide, hydrogen iodide, sulfuric acid, phosphoric acid, acetic acid, lactic acid, citric acid, tartaric acid, gluconic acid, ascorbic acid, methanesulfonic acid, benzoic acid and toluenesulfonic acid.

If it is desired to prepare non-toxic, pharmacologically acceptable quaternary salts of the free bases, compounds III or IV are reacted with a quaternizing agent of the formula $$R_2 - Hal \qquad (V)$$

wherein $R_2$ is a saturated or unsaturated acyclic hydrocarbon radical with 3 carbon atoms and Hal is chlorine, bromine or iodine, in the presence of an inert organic solvent, especially a ketone, at elevated temperatures, preferably at the boiling point of the reaction mixture. In place of the inert organic solvent it is also possible to use a large excess of the quaternizing agent V. The quaternizing procedure thus results in benzomorphanium compounds of the formula

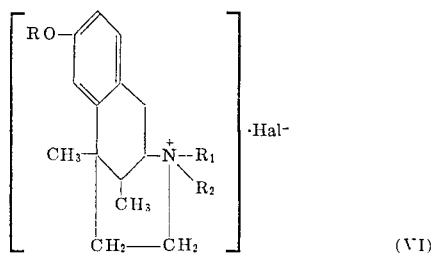

(VI)

wherein R is hydrogen or acyl, especially lower alkanoyl, $R_1$ and $R_2$ are identical or different saturated or unsaturated acyclic hydrocarbon radicals with 3 carbon atoms and Hal is a non-toxic, pharmacologically acceptable halogen anion, i.e. chlorine, bromine or iodine.

In the preparation of those quaternary benzomorphanium salts wherein $R_1$ and $R_2$ are identical, the introduction of these radicals into the benzomorphan molecule, that is the alkylation and quaternization steps, may be accomplished in a single step by reacting compound III with at least two mol equivalents of compound II. However, this method produces less favorable yields than the analogous two-step method. It is therefore preferred to perform the alkylation and quaternization steps in two separate operations with intermediate isolation of the tertiary base III or IV. Of course, if quaternary benzomorphanium compounds of the formula VI are to be prepared wherein $R_1$ and $R_2$ are different from each other, the alkylation and quaternization steps must necessarily be performed in two separate operations. Moreover, if $R_1$ and $R_2$ are different, a reversal in the sequence of their introduction into the benzomorphan molecule may lead to stereoisomeric forms of the same compound.

The 2'-hydroxy-5,9-dimethyl-6,7-benzomorphan used as the starting material in the preparation of the compounds of the present invention was obtained by the method described in the article of May and Eddy (loc. cit.), i.e., by subjecting 2'-acetoxy-2,5,9-trimethyl-6,7-benzomorphan to cyanogen bromide degradation.

The following examples will further illustrate the present invention and enable others skilled in the art to understand it more completely. It is understood, however, that these examples are given for purposes of illustration only and are not intended as a delineation of the scope of the invention.

EXAMPLE I

Preparation of 2'-hydroxy-5,9-dimethyl-2-allyl-6,7-benzomorphan

A mixture consisting of 2 gm 2'-hydroxy-5,9-dimethyl-6,7-benzomorphan, 1.12 gm sodium bicarbonate, 1.12 gm allyl bromide and 50 cc absolute ethanol was refluxed for 7 hours, accompanied by stirring. Thereafter, the reaction mixture was allowed to cool and was evaporated to dryness in vacuo. The residue was extracted with three separate 50 cc portions of hot chloroform, and the combined chloroform extract solutions were again evaporated in vacuo to dryness. The residue was taken up in 20 cc hydrochloric acid and the resulting solution was shaken for half an hour with about 0.3 gm of decolorizing charcoal. Thereafter, the solution was filtered, the filtrate was cooled on an ice bath and then made alkaline with concentrated ammonia while stirring. A precipitate formed which was separated by vacuum filtration, washed with water and dried. 1.5 gm of practically pure 2'-hydroxy-5,9-dimethyl-2-allyl-6,7-benzomorphan having a melting point of 145° to 152°C. were obtained. For analysis, the product thus obtained was recrystallized from acetone, whereupon it had a melting point of 150° to 153°C.

Analysis: $C_{17}H_{23}NO$; mol. wt. = 257.2
Calculated: C 79.40% H 8.95%
Found: C 79.07% H 8.88%
Probable structural formula:

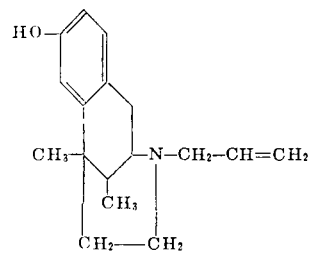

Its hydrochloric acid addition salt, obtained by dissolving the free base in hydrochloric acid, evaporating the solution to dryness and recrystallizing the residue from a mixture of ethanol and ether (1:1), had a melting point of 154°C.

EXAMPLE II

Preparation of 2'-hydroxy-5,9-dimethyl-2-n-propyl-6,7-benzomorphan

A mixture of 1.5 gm 2'-hydroxy-5,9-dimethyl-6,7-benzomorphan, 1.18 gm n-propyl iodide, 0.70 gm sodium bicarbonate and 50 cc ethanol was refluxed for 7 hours and the resulting reaction mixture was worked up as described in Example I. 1.1 gm of 2'-hydroxy-5,9-dimethyl-2-n-propyl-6,7-benzomorphan were obtained. Recrystallized from methanol, the product had a melting point of 174°C. Probable structural formula:

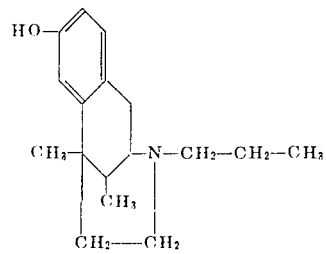

Its hydrobromic acid addition salt, obtained with HBr in a manner analogous to that described in the preceding Example for the preparation of the hydrochloride, had a melting point of 130°C. after recrystallization from acetone.

EXAMPLE III

Preparation of 2'-hydroxy-5,9-dimethyl-2,2-diallyl-6,7-benzomorphanium bromide 750 mgm 2'-hydroxy-5,9-dimethyl-2-allyl-6,7-benzomorphan were dissolved in 25 cc acetone. Thereafter, 25 cc allyl bromide were added to the solution, and the resulting mixture was refluxed for 5 hours. A crystalline precipitate was formed. The reaction mixture was then cooled at +5°C. for 12 hours, to bring the precipitation of the reaction product to completion. The precipitate was separated by vacuum filtration, washed with ice-cold acetone and recrystallized from ethanol. 820 mgm of 2'-hydroxy-5,9-dimethyl-2,2-diallyl-6,7-benzomorphanium bromide having a melting point of 228° to 230°C. and the probable structural formula

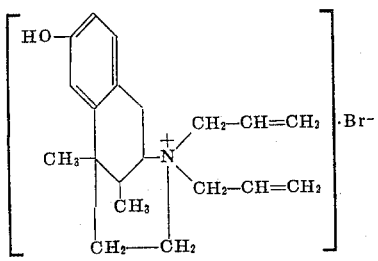

were obtained.
Analysis: $C_{20}H_{28}NOBr$; molecular weight = 378.1
Calculated: C 63.49% H 7.41%
Found: C 63.44% H 7.40%

EXAMPLE IV

Preparation of 2'-hydroxy-5,9-dimethyl-2,2-di-n-propyl-6,7-benzomorphanium bromide 500 mgm of 2'-hydroxy-2-propyl-5,9-dimethyl-6,7-benzomorphan were dissolved in 10 cc acetone, and 10 cc n-propyl bromide were added to the resulting solution. The reaction mixture thus obtained was refluxed for 24 hours. Thereafter, it was allowed to cool and was kept in a refrigerator for three days. A crystalline precipitate was formed which was filtered off and was recrystallized from acetone. The product had a melting point of 249°C. and the probable structural formula

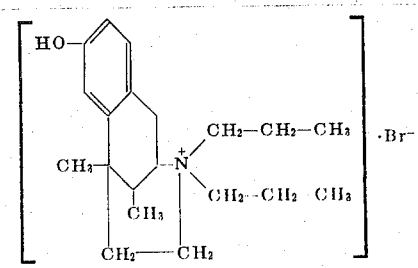

EXAMPLE V

Preparation of 2'-hydroxy-5,9-dimethyl-2-n-propyl-2-propargyl-6,7-benzomorphanium bromide 500 mgm of 2'-hydroxy-2-n-propyl-5,9-dimethyl-6,7-benzomorphan were dissolved in 10 cc acetone, and 10 cc propargyl bromide were added to the solution. The resulting reaction mixture was refluxed for 2 hours and was then allowed to cool, whereby a crystalline precipitate separated out. The precipitate was filtered off and recrystallized from ethanol, yielding a product having a melting point of 218°C. and the probable structural formula

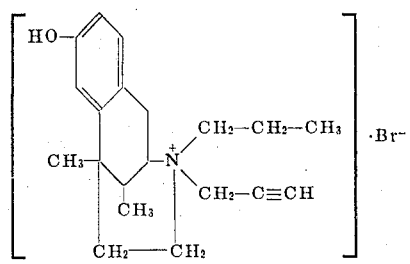

EXAMPLE VI

Preparation of 2'-hydroxy-5,9-dimethyl-2-n-propyl-2-allyl-6,7-benzomorphanium bromide 600 mgm of 2'-hydroxy-2-n-propyl-5,9-dimethyl-6,7-benzomorphan were dissolved in 12 cc acetone, and 15 cc allyl bromide were added to the solution. The resulting reaction mixture was refluxed for 2 hours and was then allowed to cool. A precipitate formed, which was filtered off and recrystallized from acetone, yielding a product having a melting point of 226°C. and the probable structural formula

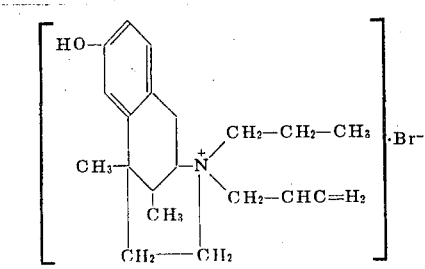

EXAMPLE VII

Preparation of 2'-acetoxy-5,9-dimethyl-2-n-propyl-6,7-benzomorphan

A mixture of 7 gm 2'-hydroxy-2-n-propyl-5,9-dimethyl-6,7-benzomorphan and 35 cc acetic acid anhydride was boiled for 20 minutes and was then allowed to cool. Thereafter, it was combined with five times its volume of ice and the resulting mixture was made alkaline with concentrated ammonia. An oily substance separated out which was extracted with ether. The ether extract solution was dried over magnesium sulfate, the ether was evaporated in vacuo and the residue was distilled. 5 gm of a light, viscous oil were obtained which had a boiling point of 140° to 150°C., at 0.2 mm Hg and the probable structural formula

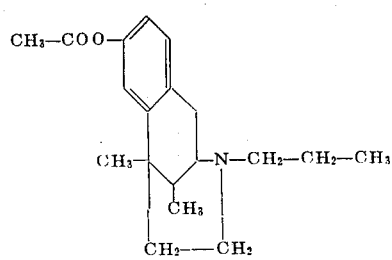

EXAMPLE VIII

Preparation of 2'-acetoxy-5,9-dimethyl-2-n-propyl-2-allyl-6,7-benzomorphanium bromide 2 gm of 2'-acetoxy-5,9-dimethyl-2-n-propyl-6,7-benzomorphan were dissolved in 15 cc allyl bromide. The resulting solution was refluxed for 3 hours. A recrystalline precipitate formed which was separated by vacuum filtration and recrystallized from ethanol. The product had a melting point of 202°C. and the probable structural formula

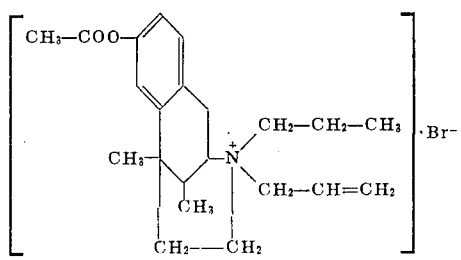

For therapeutic purposes the compounds according to the present invention are administered in dosages of 5 to 80 mgm, and preferably 10 to 50 mgm, in the form of tablets, injectable solutions or suppositories. The following are typical examples of such compositions:

1. Tablets:
Each tablet contains:

| | |
|---|---|
| 2'-hydroxy-5,9-dimethyl-2,2-diallyl-6,7-benzomorphanium bromide | 0.03 gm |
| Lactose | 0.11 gm |
| Starch | 0.065gm |
| Stearic acid | 0.001gm |
| Talcum | 0.009gm |
| Finely milled SiO$_2$ | 0.005gm |
| Weight of each tablet | 0.220gm |

2. Injectable solution in 1 cc ampules:
Each ampule contains:

| | |
|---|---|
| 2'-hydroxy-5,9-dimethyl-2,2-diallyl-6,7benzomorphanium bromide | 0.02 gm |
| Sodium chloride | 0.0070gm |
| Hydrochloric acid (0.001 N) q.s.ad | 1.0 ml |

3. Suppositories:
Each suppository contains:

| | |
|---|---|
| 2'-hydroxy-5,9-dimethyl-2-n-propyl-6,7-benzomorphan | 0.01 gm |
| Lactose | 0.04 gm |
| Suppository mass | 1.60 gm |
| Weight of each suppository | 1.65 gm |

It should be understood that the above compositions are merely illustrative examples of the various forms in which the active compounds according to the present invention may be therapeutically administered. It is self-evident that any other compound embraced by formula I above or the corresponding non-toxic, pharmacologically acceptable acid addition and quaternary salts may be substituted for the particular active ingredient given in the above prescription examples. Similarly, the dosages of active ingredient in these compositions may be varied within the above indicated limits to suit the particular requirements.

While I have set forth a number of specific examples to my invention, it is to be understood that these specific embodiments are given for purposes of illustration. One skilled in the art can readily envision that various changes and modifications of the examples can be made without going beyond the scope of the appended claims.

We claim:
1. 2'-hydroxy-5,9-dimethyl-2,2-diallyl-6,7-benzomorphanium-bromide.
2. 2'-hydroxy-5,9-dimethyl-2-n-propyl-6,7-benzomorphan.
3. 2'-hydroxy-5,9-dimethyl-2-allyl-6,7-benzomorphan.
4. 2'-hydroxy-5,9-dimethyl-2-n-propyl-2-allyl-6,7-benzomorphanium-bromide.
5. 2'-hydroxy-5,9-dimethyl-2-n-propyl-2-propargyl-6,7-benzomorphanium-bromide.
6. 2'-acetoxy-5,9-dimethyl-2-n-propyl-2-allyl-6,7-benzomorphanium-bromide.
7. The compound of the formula

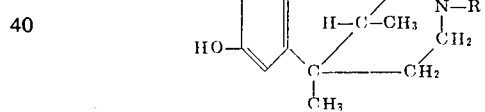

in which R is a member of the group consisting of —CH$_2$—CH=CH$_2$ and —CH$_2$—CH=CH.

* * * * *

UNITED STATES PATENT OFFICE
CERTIFICATE OF CORRECTION

Patent No. 3,723,440    Dated March 27, 1973

Inventor(s) KURT FRETER and KARL ZEILE

It is certified that error appears in the above-identified patent and that said Letters Patent are hereby corrected as shown below:

[73] Assignee: "C. H. BOEHRINGER SOHN" should read --By Mesne Assignments to BOEHRINGER INGELHEIM G.m.b.H--

Column 6, that part of the 2nd formula which reads

" 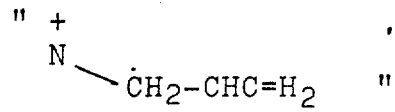 "

should read

-- 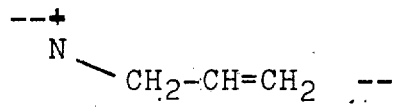 --

Column 8, last line, correct "-$CH_2$-CH=CH"

to read -- -$CH_2$-C≡CH--

Signed and sealed this 16th day of April 1974.

(SEAL)
Attest:

EDWARD M.FLETCHER,JR.
Attesting Officer

C. MARSHALL DANN
Commissioner of Patents